Jan. 10, 1967 C. S. COCKERELL 3,297,102
AIR CUSHION VEHICLES HAVING ATTITUDE-CORRECTING SKIRTS
Filed June 16, 1964 5 Sheets-Sheet 3
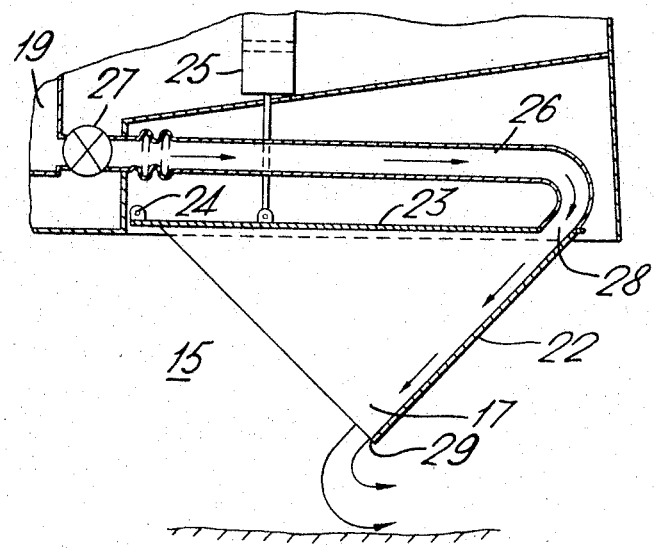
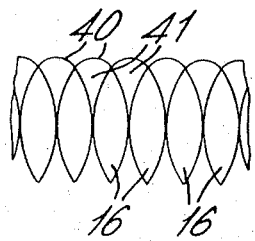
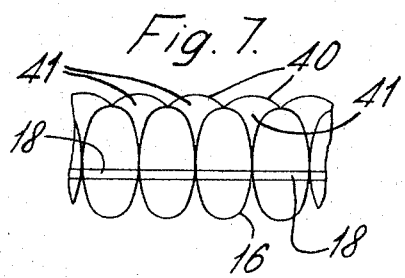
INVENTOR
C. S. COCKERELL
BY
Cameron, Kerkam & Sutton
ATTORNEYS

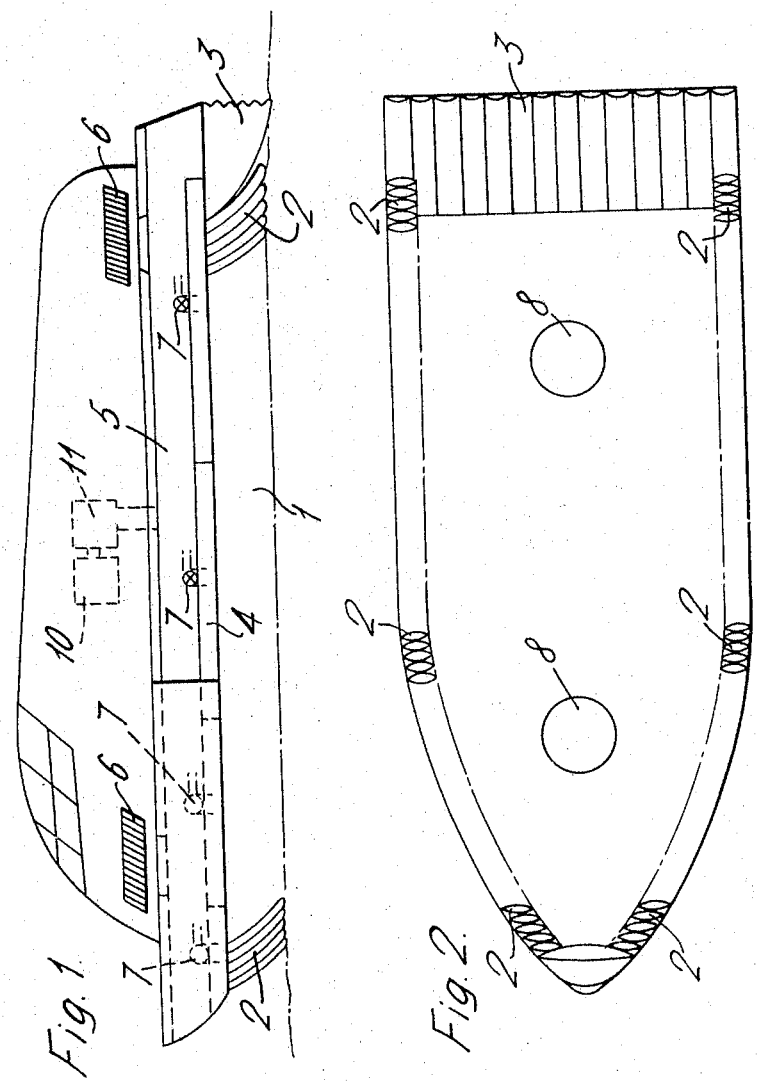

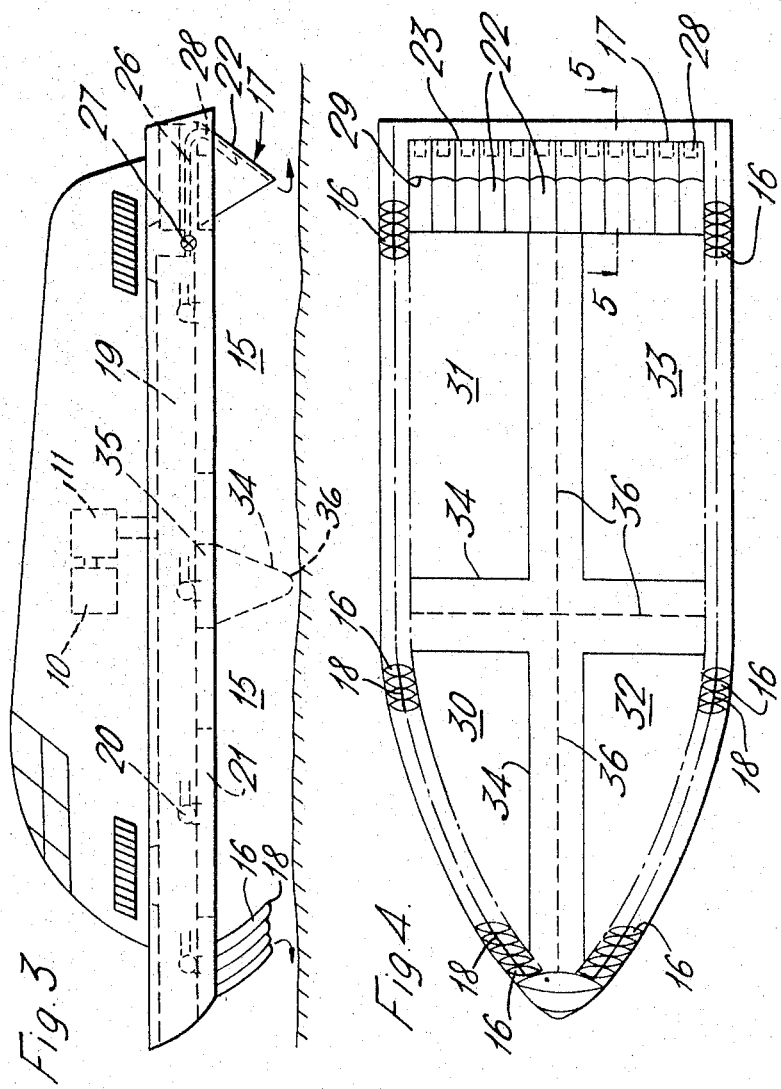

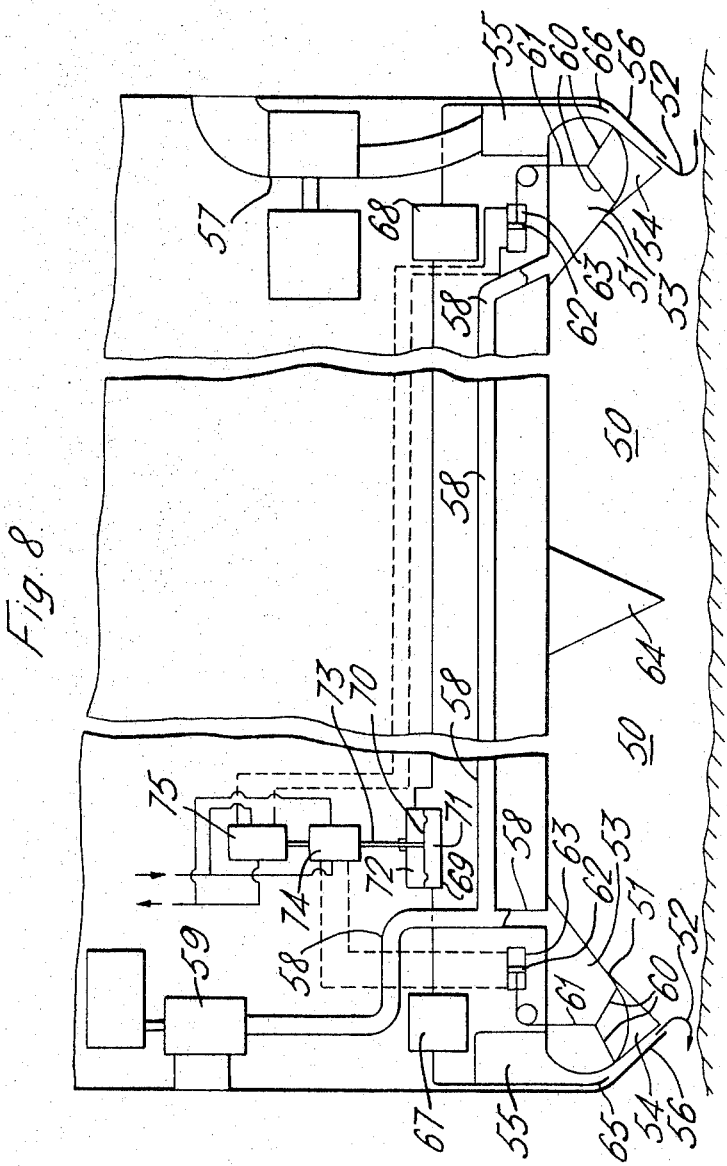

United States Patent Office 3,297,102
Patented Jan. 10, 1967

3,297,102
AIR CUSHION VEHICLES HAVING
ATTITUDE-CORRECTING SKIRTS
Christopher Sydney Cockerell, Bassett, Southampton,
England, assignor to Hovercraft Development Limited,
London, England, a British company
Filed June 16, 1964, Ser. No. 375,496
Claims priority, application Great Britain, June 21, 1963,
24,819/63
5 Claims. (Cl. 180—7)

This invention relates to vehicles for travelling over a surface and which are supported above that surface, at least in part, by a cushion of pressurised gas formed and contained in a space beneath the vehicle.

The cushion space may be bounded by one or more downwardly depending walls, which may or may not be movably attached to the vehicle, or by one or more curtains of moving fluid issuing from the lower part of the vehicle, or by a combination of wall and curtain.

When the vehicle is supported above the surface, there will be at all times a desirable attitude of the vehicle relative to the surface. This attitude will include the inclination of the vehicle relative to the surface both in a fore and aft direction and in an athwartships direction, and also the desirable clearance between the bottom surface of the main body of the vehicle and the surface. The vehicle may depart from the desirable attitude during operation either through pitching, rolling or heaving movement of the vehicle, or as a result of a variation in the surface, or by a combination of these.

It has been proposed to subdivide the gaseous cushion or provide a series of cushions so that localised pressure variations will create righting forces which will be applied to the vehicle in the event of the vehicle departing from a desirable attitude relative to the surface but these forces can sometimes act in an undesirable phase relationship with respect to the movement of the vehicle relative to the surface. Further, such forces can only occur when there is variation in the attitude of the vehicle relative to the surface.

The present invention is concerned with the provision of means whereby forces can be produced on a vehicle in a controlled manner at the required time. In addition to the forces being applied as required to maintain the vehicle substantially at the desired attitude, the forces can also be applied so as to vary the attitude of the vehicle as desired. Thus it will be possible to determine the desirable attitude of the vehicle relative to the surface and to provide forces acting on the vehicle which will bring the vehicle to this attitude and maintain it at this attitude.

According to the invention there is provided a vehicle of the type which in operation is supported above a surface, at least in part, by a cushion of pressurised gas formed and contained in a space beneath the vehicle, comprising a movable structure attached to the main body of the vehicle and depending below the bottom surface of the main body of the vehicle, means for moving the structure vertically, as a whole or locally, relative to the vehicle so as to vary the position of the lower part of the structure relative to the surface, means for detecting a variation in attitude of the vehicle from a desired attitude relative to the mean surface, and control means operative to control the movement of the structure in accordance with the variations so detected to move the structure downwardly at a locality at which the clearance between the main body of the vehicle and the surface is decreased to produce vertical forces on the vehicle in opposition to such variation in attitude.

The movable structure can be part of the cushion containing means or can be independent thereof.

The means for moving the structure can be controlled manually. Alternatively some suitable means for detecting variation in attitude of the vehicle from a desirable attitude may be used to control the means for moving the structure, or such means may be combined with a manual control.

The structure may be moved so as to cause it to engage with the surface to produce the desired forces, or where it is already in engagement with the surface, can be caused to increase its engagement with the surface. Where a curtain of moving fluid is formed from the lower part of the structure, the movement of the structure may be to vary the height to be sealed by the curtain and thus vary a cushion pressure. In so called "plenum chamber" vehicles, movement of the structure may be to vary the clearance between the bottom of the structure and the surface to vary cushion pressure.

The application of the invention will be readily understood by the following description of certain embodiments, by way of example, in conjunction with the accompanying drawings in which:

FIGURE 1 is a diagrammatic side elevation of a vehicle,

FIGURE 2 is an inverted plan of the vehicle illustrated in FIGURE 1,

FIGURE 3 is a diagrammatic side elevation of yet another vehicle,

FIGURE 4 is an inverted plan of the vehicle illustrated in FIGURE 3,

FIGURE 5 is a cross-section on the line 5—5 of FIGURE 4 to an enlarged scale,

Figure 9:
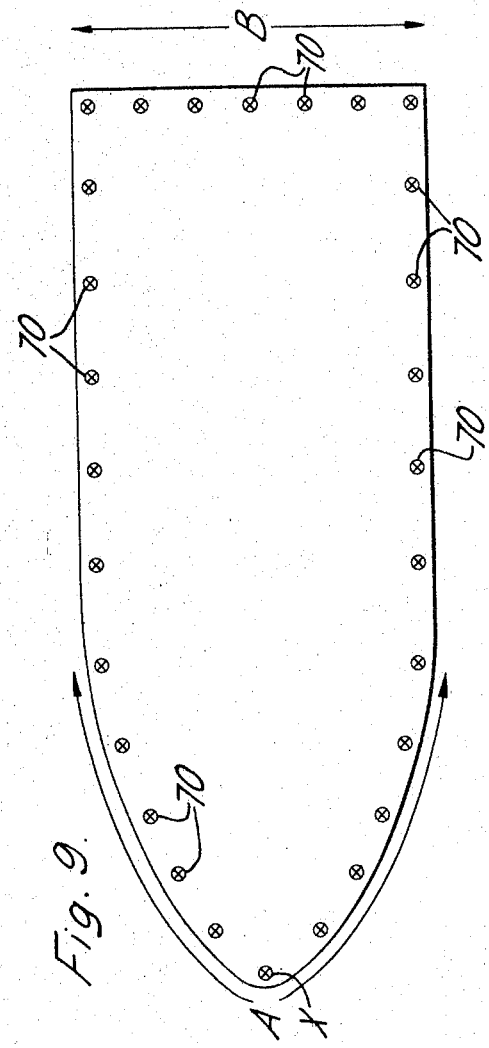

FIGURE 6 illustrates a modification of the movable structure of the vehicle illustrated in FIGURES 3 and 4, to an enlarged scale, FIGURE 7 illustrates a further modification of the movable structure of the vehicle illustrated in FIGURES 3 and 4, to an enlarged scale, FIGURE 8 is a diagrammatic transverse cross-section through the lower part of a further vehicle, and FIGURE 9 is a diagrammatic plan view illustrating the positioning of probes acting as attitude detectors.

In one particular form of vehicle, generally referred to as a plenum chamber vehicle, the cushion of pressurised gas is contained at its periphery by a structure which extends from the bottom of the vehicle towards the surface. When the vehicle is in operation, a small gap exists between the bottom of the structure and the surface through which escapes gas from the cushion. The whole of the structure, or only the lower part, may be movable. By moving the movable part vertically downwards in accordance with one feature of the present invention, the bottom of the structure can be caused to engage with the surface. The movable part can be moved locally or as a whole. Over water the structure may engage the surface directly or planing surfaces, hydrofoils, displacement means or the like can be attached to the bottom of the structure. The construction of the movable structure can vary considerably.

FIGURES 1 and 2 illustrate a vehicle of the plenum chamber type, the cushion space 1 being contained by a movable structure comprising a series of inflatable members 2, depending from the periphery of the bottom surface of the vehicle and extending from the front along the sides of the vehicle. A further inflatable member 3 extends across the back of the vehicle to complete the enclosure of the space in which a cushion of pressurised gas can be formed.

The inflatable members 2 are inflated from ducts 4 extending along the sides of the vehicle. The ducts 4 are divided into separate sections and are in turn fed from a plenum chamber 5 extending over the bottom of the vehicle. Air is fed to the plenum chamber 5 by engines, not shown, drawing in air through intakes 6. The supply of air to the separate sections of the ducts 4 is controlled by valves 7. Air is also fed from the plenum chamber 5 to the cushion space 1 through ports 8 in the bottom of the vehicle. The size of the ports 8 is such as will allow sufficient flow of air to the cushion space to maintain the desired pressure.

The air in the plenum chamber 5 can be at any desirable pressure, generally above that of the cushion, and the pressure in the various sections of the ducts 4 can be varied up to the pressure in the plenum chamber. The pressure in the duct sections, and thus the inflation pressure, is increased by admitting air from the plenum chamber; the pressure may be decreased by venting air, for example to atmosphere, from the duct sections.

The bottoms of the members 2 will be in contact with the surface for most of the time, although small clearances will exist from place to place. The shape and positioning of the members will depend upon the method of construction and on the inflation pressure. For example, the members may have their opposing sides of materials having different extensibility. By making the members with an initial curve, increase in inflation pressure can cause the members to become straighter and vice versa. Alternatively the members can be constructed so that their inclination will vary with variation in inflation pressure.

Provided at a convenient position in the vehicle is an attitude detecting device 10 which detects undesirable movements and/or accelerations of the vehicle in heave, pitch and roll. Typical examples of devices for detecting pitch and roll are gyroscopes, and for detecting heave, accelerometers may be used. The device 10 actuates a control system 11 which in turn controls the valves 7.

The datum of the control system 11 is set so that the inflation pressure of the members 2 is sufficient to maintain them at an intermediate position or inclination. If the vehicle now rolls, and thus tilts down one side, reducing the clearance between the main body of the vehicle and the surface at that locality, the detecting device detects this roll and actuates the respective sections of the control system 11 which in turn operates valves 7 to increase the pressure in the inflatable members 2 on the side of the vehicle which is tilted downwards. Further, the pressure in the inflatable members 2 on the other side of the vehicle may be decreased to decrease any contact between the members and the surface. The increase in pressure will cause the members to attempt to assume a more vertical position, and they will thus first restrict any clearance which may exist and then bear against the surface, providing a force on the vehicle. This force will act on the vehicle to correct the roll. Variations in pitch can be corrected in a similar manner by varying the inflation pressure of the member 3 and the members 2 at the front of the vehicle. Combinations of variations in pitch and roll and also movements in heave can be corrected.

The variation in inflation pressure can be arranged to occur at the positions producing the best effect. Thus for roll the sides are most effective, and for pitch the ends. In a vehicle having a more rectangular plan form, it can be arranged that only the structure adjacent to each corner is actuated as it is at these positions that maximum effect will occur both for pitch and roll. Simultaneous actuation of the structures at each corner will also be effective to correct and/or control heave. A "tapering off" effect may be desirable between these positions so that the structure between these positions deflects downwards, at least to some extent, to avoid the formation of gaps below the structure, but not sufficient to provide any effective forces on the vehicle. To control or correct variations in heave, the variation in inflation pressure occurs simultaneously at all positions.

In vehicles intended more specifically for operating over land surfaces, wheels, rollers or tracks may be provided for contacting the surface.

The vehicle described so far with reference to FIGURES 1 and 2 is supported by a single cushion of pressurised gas contained at its periphery by a movable structure although the cushion can be compartmented by further members of any convenient form. The selective movements of parts of the structure relative to the vehicle and the surface, resulting in changes in any clearance between structure and surface and in contact between them, may be sufficient to maintain the desired attitude of the vehicle not only against transient effects such as those caused by irregularities in the surface, but also against more lasting effects such as those due to movement of the centre of gravity of the vehicle through shift of its load. Further, the selective movements of the structure can be used to deliberately vary the attitude of the vehicle. Thus it may be desired to tilt the front of a vehicle upward preparatory to moving up an incline, such as moving from over a water surface on to land.

As stated above, it has been proposed to subdivide the gaseous cushion or to form several separate cushions, so that the pressure in each section of the cushion or each cushion can be varied relative to the other sections or cushions. In plenum chamber vehicle, that is, vehicles of the type in which a structure depending from the bottom of the vehicle contains the cushion or cushions and having a small gap between the bottom of the structure and the surface through which gas escapes from the cushion, pressure variations occur in the various sections of the cushion or various cushions as a result of a variation in the clearance between the bottom of the structure and the surface either locally or for the entire periphery of the cushion.

In vehicles in which one or more curtains of moving fluid contain the cushion or cushions, pressure variations will occur in the various sections of the cushion, or in the various cushions, if the height to be sealed by the fluid curtain varies, again either locally or for the entire periphery of the cushion. In both forms of vehicle, pressure variations in the cushion sections or various cushions, only occur if the vehicle moves such as in roll, pitch or heave, or if the surface "moves," e.g. the vehicle passes over a wave on a water surface, or over hillocks, sand dunes, gulleys or the like on a land surface. Whilst the pressure variations may tend to stabilise the vehicles, they may also act to unstabilise the vehicle, or cause undesired movement or produce movements at the wrong time. Thus, for example, when passing over a wave or similar obstacle, pressure variations will occur in the cushion sections which will tend to cause the vehicle to lift as it goes over the obstacle. However, if the vehicle is at a clearance above the normal level of the surface which is sufficient to clear the obstacle there may be no need to lift the vehicle. It may also be desirable to deliberately alter the attitude of the vehicle, such as when transferring from one surface to another, or to provide a change in trim of the vehicle to offset a trim variation due to a change in the centre of gravity of the vehicle, for example due to a variation in loading of the vehicle.

Control of the variation of pressure in the various sections of the cushion or in the various cushions can be provided by providing means for moving vertically at least the lower part of the structure in a plenum chamber vehicle so as to control the variation in clearance between the bottom of the structure and the surface, or by providing means for moving vertically the position from which issues the fluid forming the fluid curtain so that the height to be sealed by the fluid curtain can be controlled. FIGURES 3, 4 and 5 illustrate a vehicle in which the cushion space 15 is contained at its periphery by a combination of movable structure and fluid curtain, the structure containing the cushion for the upper part of its periphery and the curtain containing the cushion for the lower part of its periphery. The structure comprises flexible members 16 depending below the bottom of the vehicle along the sides thereof, and a flexible member 17 extending across the rear of the vehicle. The members 16 at the two sides of the vehicle are similar to the members 2 of FIGURE 1 except that they have ports 18 at their free ends. The members 16 are inflated by gas reaching them from a plenum chamber 19 via valves 20 and ducts 21 and take up a shape or inclination depending on the inflation pressure and construction as described above with respect to FIGURES 1 and 2. The ports 18 are so placed that the gas escaping through them forms a gaseous curtain.

The member 17 formed across the rear of the vehicle is in the form of a flexible skirt constituted by a series of channel shaped pieces of flexible fabric such as is described in the commonly owned co-pending application of Denys Stanley Bliss, Serial No. 267,695, filed March 25, 1963. The bases 22 of each channel constitute the effective part of the skirt, and each channel shaped piece is attached at one end to a frame 23 movable relative to the bottom of the vehicle, being pivotted at 24 by a hydraulic jack 25. The arrangement is illustrated in more detail in FIGURE 5. A duct 26 is in communication with the plenum chamber 19 via a valve 27 and feeds nozzles 28 which discharge a gas down the base of each channel, the gas emerging from the free ends 29 as a gaseous curtain. The curtain formed by the gas issuing from the ports 18 formed in the bottom of the members 16, together with the gaseous curtain formed from the bottom of the member 17 seals the lower part of the periphery of the cushion space 15. The members 16 and 17 bound the cushion space 15 for the upper part of its periphery. The cushion space is divided into four compartments or sections, 30, 31, 32, 33 by flexible walls 34. These walls comprise inflatable bags filled with pressurised gas delivered by way of ducts 35. Thise gas escapes from the bags through orifices 36 to form curtains in the manner of the gas which escapes through corresponding ports 18 in the members 16.

If the vehicle rolls, one side of the vehicle moves down, and normally the other side moves up. This produces a reduction in the height to be sealed by the gaseous curtain on one side and an increase in height on the other. Taking as an example the vehicle in FIGURES 3 and 4 rolling so that the port side tilts downward, there is a reduction in height and thus in clearance between the main body of the vehicle and the surface on the port side, normally accompanied by an increase in height on the starboard side. These variations in height result in an increase in pressure in the compartments 30 and 31 and a decrease in pressure in the compartments 32 and 33 (FIGURE 4 being an inverted plan). Whilst such pressure variations will produce forces on the vehicle tending to oppose the roll, the maximum effect will not occur until maximum roll has occurred. By providing detecting means as in FIGURES 1 and 2 to detect any variation in attitude of the vehicle, the inflation pressures of the members 16 along the sides of the vehicle can be varied so as to produce righting forces of a high magnitude immediately the attitude of the vehicle starts to alter. Thus the inflation pressure of the members 16 on the port side can be increased and if desired, the inflation pressure of the members 16 on the starboard side decreased. The effect is to anticipate the variation in height which occurs when the vehicle rolls and thus provide maximum righting forces earlier.

Variation of the inflation pressures of the members 16 at the front of the vehicle and movement of the frame 23 up or down provide means for forming righting forces immediately pitching of the vehicle is detected. Operation of members 16 and 17 in unison will provide forces for controlling heave.

Although in the above description the terms roll, pitch and heave have been used, these should be interpreted as being relative terms. The vehicle may in fact not move itself but the surface over which the vehicle is travelling may vary so as to produce the equivalent effects of roll, pitch and heave.

In appropriate cases the members 16 might be inflated so hard that their tips bear against the surface, thereby blocking the ports 18 and providing a positive solid-to-solid reaction to right the vehicle.

Instead of forming ports in the bottoms of the members 16, fluid can be caused to flow down one side of the members to form a curtain. FIGURE 6 illustrates a modification of the vehicle illustrated in FIGURES 3 and 4 in which a flexible diaphragm 40 is attached to the outside of the members 16. In this case no ports are formed in the bottoms of the members 16. Fluid is fed from the plenum chamber 19, in FIGURE 3, down each of the spaces 41 formed between the diaphragm 40 and the members 16, to issue from the bottom thereof and form a curtain.

In a further alternative, parallel curtains of fluid can be formed beneath the structure, containing a subsidiary cushion of gas between them. Variation of the clearance between the bottoms of the members and the surface will vary the pressure of the subsidiary cushion and such pressure variations can be used to produce the desired forces on the vehicle. For example, by causing the clearance to be reduced, an increase in pressure of the subsidiary cushion will occur to produce an upward thrust on the vehicle. FIGURE 7 illustrates a further modification of the vehicle illustrated in FIGURES 3 and 4 in which the diaphragm 40 of FIGURE 6 is combined with the provision of the ports 18 in the bottoms of the members 16. The members 16 have a more rectangular cross-section so that an area is provided over which the subsidiary cushion can act. The subsidiary cushion is formed and contained between the curtain formed by fluid issuing from the ports 18 and the curtain formed by fluid issuing from the spaces 41.

In vehicles as illustrated in FIGURES 3 to 7, the cushion will normally initially be formed of fluid that also forms the curtains. Once the cushion has been formed, only small amounts of fluid transfer from the curtains to the cushion. If appropriate however, the cushion compartments may also be supplied from the plenum chamber, through ports in the bottom of the vehicle similar to the ports 8 shown in FIGURE 2. Again, although the vehicle illustrated in FIGURES 3 and 4 is shown as having curtains of moving fluid formed all round the periphery of the cushion, a fluid curtain may only extend for part of the periphery, the members forming the structure which contains the cushion for the remainder of the periphery extending down to the surface, as in FIGURES 1 and 2. In this latter instance it is possible to omit the subdivision of the cushion space as the righting forces can be provided by the members extending right down to the surface, in a similar manner to the arrangement illustrated in FIGURES 1 and 2. Where provided, the flexible walls 34 may not have curtains of fluid issuing from their bottom edges.

FIGURE 8 illustrates a vehicle in which the cushion space 50 is bounded for the upper part of its periphery by a structure 51 which is of a two-stage form, the cushion space being bounded for the lower part of its periphery by a fluid curtain 52.

The structure 51 comprises an upper stage 53 which is in the form of an inflated bag, and a lower stage 54 which is attached to the lower part of the upper stage 53 and is formed, for example, of a series of separate channel shaped sections made of flexible material. Air is fed through ducts 55 to further ducts 56 attached to the outside of the stages 53 and 54, issuing from the bottom of the ducts to form the curtains 52. Air is supplied to the ducts 55 from a compressor 57.

The upper stages 53 is inflated via pipes 58 connected to a compressor 59. The lower part of the upper stage can be pulled upwards by means of cords or diaphragms 60 connected to wires 61 which are, in turn, connected to pistons 62, working in cylinders 63. The lower part will be pulled up against the effect of the inflation pressure and thus the vertical position of the lower part of the upper stage can be varied at will.

The lower stage 54, being attached to the lower part of the upper stage, will rise and fall with the lifting and lowering of the lower part of the upper stage. Also, as the lower stage is of flexible material, this can also deflect if necessary.

The cushion of pressurized gas formed in the space 50 can be divided into compartments by flexible members 64, in a similar manner to the vehicle illustrated in FIGURES 3 and 4.

In operation, variations in attitude of the vehicle can be detected, signals from the detecting means being used to control the operation of the pistons 62. The variation in attitude can be detected by various sensing means, such as gyroscopes, accelerometers or the like as described above with respect to FIGURES 1 and 2. Alternatively, in a vehicle embodying fluid curtains as in FIGURE 8, means may be provided for detecting variations in a characteristic of the flow of fluid forming the curtains which varies in relation to variation in the height, or clearance, between the bottom of the ducts 56 and the surface over which the vehicle is operating. Such parameters are the velocity and pressure of the flow of fluid through the ducts 56 or the angle of ejection of the fluid from the bottoms of the ducts 56.

Illustrated in FIGURE 8 is a detecting and control system in which the pressure in the ducts 56 is sensed and applied to actuate the pistons 62. The pressure in the ducts 56 is sensed by probes 65 and 66 connected to chambers 67 and 68. For detection and control of pitching the probes 65 at the front of the vehicle are all connected to chamber 67, while the probes 66 at the rear of the vehicle are connected to chamber 68. The chambers 67 and 68 are connected to a capsule 69, having a central flexible diaphragm 70 forming two compartments 71 and 72. Chamber 67 is connected to compartment 71 and chamber 68 is connected to compartment 72. From the diaphragm 70 extends a rod 73 connecting to control valves 74 and 75 which control the flow of pressure fluid to and from the pistons 62 and cylinders 63.

The volumes of the chambers 67 and 68 are large with respect to the sizes of the connections to the probes 65 and 66 and to the capsule 69. Thus rapid changes of pressure in the ducts 56, such as occur when the vehicle is travelling over waves having a length which is a sub-multiple of the vehicle length, will be smoothed out and the pressures in the chambers 67 and 68 will be the same. The vehicle will thus have an attitude in which the bottom surface is parallel to the means surface level, i.e. horizontal. If now the vehicle tilts there will be superimposed on any rapid pressure changes in the ducts 56, a long term pressure variation which will pass through one or both chambers and upset the balance of the capsule 69. If the vehicle tilts down at the front, a long term pressure rise will occur in the ducts 56 at the front of the vehicle and this pressure rise will pass through the chamber 67 to the compartment 71 of the capsule 69. The diaphragm 70 will move upwards, actuating the control valves 74 and 75. Actuation of the control valve 74 will cause pressure fluid to flow to the right hand side of the cylinder 63 and thus lower the lower part of the upper stage 53 at the front of the vehicle and thus reduce the clearance between the bottom of the structure and the surface. This will produce a force opposing the tilt of the vehicle. The valve 75 can also operate to cause the lower part of the upper stage 53 at the rear of the vehicle to lift.

When the vehicle is travelling over undulations, e.g. waves, having a wave length which is a multiple of the vehicle length, then the desired attitude varies from being horizontal until, at wave lengths several times the length of the vehicle, the desired attitude will be such that the bottom surface of the vehicle is parallel to the means surface or profile of the undulation. The arrangement of probes, and chambers, capsule and control valves illustrated in FIGURE 8 will control the attitude of the vehicle so that it will attain this desired attitude. The arrangement illustrated will act automatically to adjust the desired attitude of the vehicle according to whether the vehicle is travelling over short, high frequency, undulations or long, low frequency, undulations.

A similar sensing and control arrangement can be provided to detect and correct variations in attitude which occur as a result of roll of the vehicle.

In the vehicle illustrated in FIGURE 8, small fairly rapid irregularities in the surface are accommodated by the fluid curtain 52 and distortion of the lower stage 54, whilst larger slower irregularities are accommodated by movement of the upper stage 53. Normally, the lower part of the upper stage 53 will be held at a mean position so that movements up or down can be provided. It is then possible to deliberately lower the lower part of the upper stage, together with the lower stage when desired. This will reduce the height sealed by the curtain 52 and increase the pressure in those compartments of the cushion which are bounded at that part of the upper stage which has been lowered. The upper stage can be operated in this way either locally or as a whole, in a similar manner to the members 16 and 17 in FIGURES 3 and 4 with the same effect.

The arrangement of two stages, as illustrated in FIGURE 8, can be used for a plenum chamber vehicle, that is without the ducts 55 and 56 and the fluid curtains 52.

A power operated system such as is illustrated in FIGURE 8, provides a convenient system for adding an override. Thus, while the power-operated system may be controlled by sensing or detecting means actuated as a result of a variation in the attitude of the vehicle, such as in roll, pitch or heave, it is possible to feed into the control other requirements, such as variation of trim of the vehicle, which will override the normal operation of the operating mechanism and provide for the particular movement of the movable structure which is necessary to provide the other requirements.

The lower stage of two-stage system may itself be of inflated construction with means for varying the inflation pressure, length or stiffness. This would then provide a further means for directly controlling the relationship between the bottom of the lower stage and the surface. It will be apparent that there are many other ways of constructing both the upper and lower stages and, of course, there may be more than two stages.

By positively controlling the movement of the structure it is possible to provide phase-advance of the movement. Thus by positioning sensing heads in advance of the particular part of the structure, the movement of which they control, the structure can be caused to start moving before a variation in attitude becomes apparent. FIGURE 9 is a diagrammatic plan view indicating the positions of probes 70 at various positions around the periphery of the vehicle. The probes 70 can be considered as being pressure sensers, as the probes 66 in FIGURE 8, although the probes can be arranged to sense othe parameters. As pressure sensing probes, the probes at the front of the vehicle, for example over the length A, would be connected to a chamber, as chamber 67 in FIGURE 8. Similarly the probes at the rear, over the length B, would be connected to a further chamber, as chamber 68 in FIGURE 8. These two chambers act as integrating systems and would be used to control pitching of the vehicle. The probes along each side of the vehicle can be used to detect and effect control of rolling, and all of the probes can be used to detect and effect control of heaving.

Individual probes can also be used to provide a phase advance system. For example, the probe right at the front of the vehicle, indicated at X, will detect variations in clearance at the front and this detection can be used to actuate a part of the structure toward the rear of the vehicle. Similarly, each probe can be caused to actuate, through the control valves, parts of the structure further towards the rear. To obtain complete phase advance it is necessary to have some sensing means for sensing variations in surface height in advance of the vehicle, such as by probes projecting in front of the vehicle, or some optical or electronic sensing device. Some phase advance can be obtained purely by measuring rate of pressure change sensed by the probes 70 instead of only pressure change.

It will be appreciated that the mean surface, for small rapid undulations, is normally horizontal while for long term undulations the mean surface will eventually be parallel to actual profile, although there are likely to be small rapid undulations superimposed on the long term undulations.

As stated above, various means of sensing variations in attitude of the vehicle can be used. Whilst sensing or detecting movement can be satisfactory, sensing or detecting a change in acceleration can provide an indication 90° sooner. Gyroscopes and accelerometers are typical sensing means and a further means is an aerofoil attached to the main body of the vehicle. An aerofoil has an advantage that once attached there is no need for adjustment from time to time.

I claim:

1. A vehicle for travelling over a surface and which in operation is supported above that surface, at least in part, by a cushion of pressurised gas formed and contained in a space beneath the vehicle, comprising a movable structure attached to the main body of the vehicle and extending downwardly away from the bottom surface of said main body, said structure comprising an upper stage and a lower stage flexibly attached to the lower part of the upper stage, means for moving the structure vertically, as a whole or locally, relative to the vehicle so as to vary the position of the lower part of the structure relative to the surface, said means including means for moving vertically at least the lower part of the upper stage, means for detecting a variation in attitude of the vehicle from a desired attitude relative to the mean surface, and control means operative to control the movement of the structure in accordance with the variation so detected to move the structure downwardly at a locality at which the clearance between the main body of the vehicle and the surface is decreased to produce vertical forces on the vehicle in opposition to such variation in attitude.

2. A vehicle as claimed in claim 1 wherein the lower stage is flexible.

3. A vehicle as claimed in claim 1 wherein the upper stage of the movable structure is movably attached to the main body of the vehicle, and the lower stage comprises a series of separate channel shaped sections made of flexible material.

4. A vehicle for travelling over a surface and which in operation is supported above that surface, at least in part, by a cushion of pressurised gas formed and contained in a space beneath the vehicle, comprising a movable structure attached to the main body of the vehicle and depending below the bottom surface thereof, said structure comprising an upper stage and a lower stage flexibly attached to the lower part of the upper stage, means for moving the upper stage vertically, as a whole or locally, relative to the vehicle, means for detecting variations in clearance at the front and rear of the vehicle, integrating means connected to said detecting means, and control means connected to said integrating means and said means for moving the upper stage, the whole so constructed and arranged that the attitude of the fore and aft axis of the vehicle is maintained constant when the vehicle is operating over irregularities having a wave length which is a submultiple of the vehicle length and is maintained parallel to the mean surface of the profile of irregularities having a wave length several times the length of the vehicle.

5. A vehicle as claimed in claim 4 wherein means are provided for feeding a fluid to the lower part of the movable structure to issue therefrom and form at least one curtain of moving fluid, wherein said detecting means comprises pressure responsive devices for sensing variations in the pressure of the flow of fluid to said lower part of the movable structure.

References Cited by the Examiner

UNITED STATES PATENTS 3,239,023   3/1966   Jones _____ 180—7
3,240,282   3/1966   Taylor _____ 180—7

FOREIGN PATENTS 1,344,575   10/1963   France.

BENJAMIN HERSH, *Primary Examiner.*

M. S. SALES, *Assistant Examiner.*